UNITED STATES PATENT OFFICE.

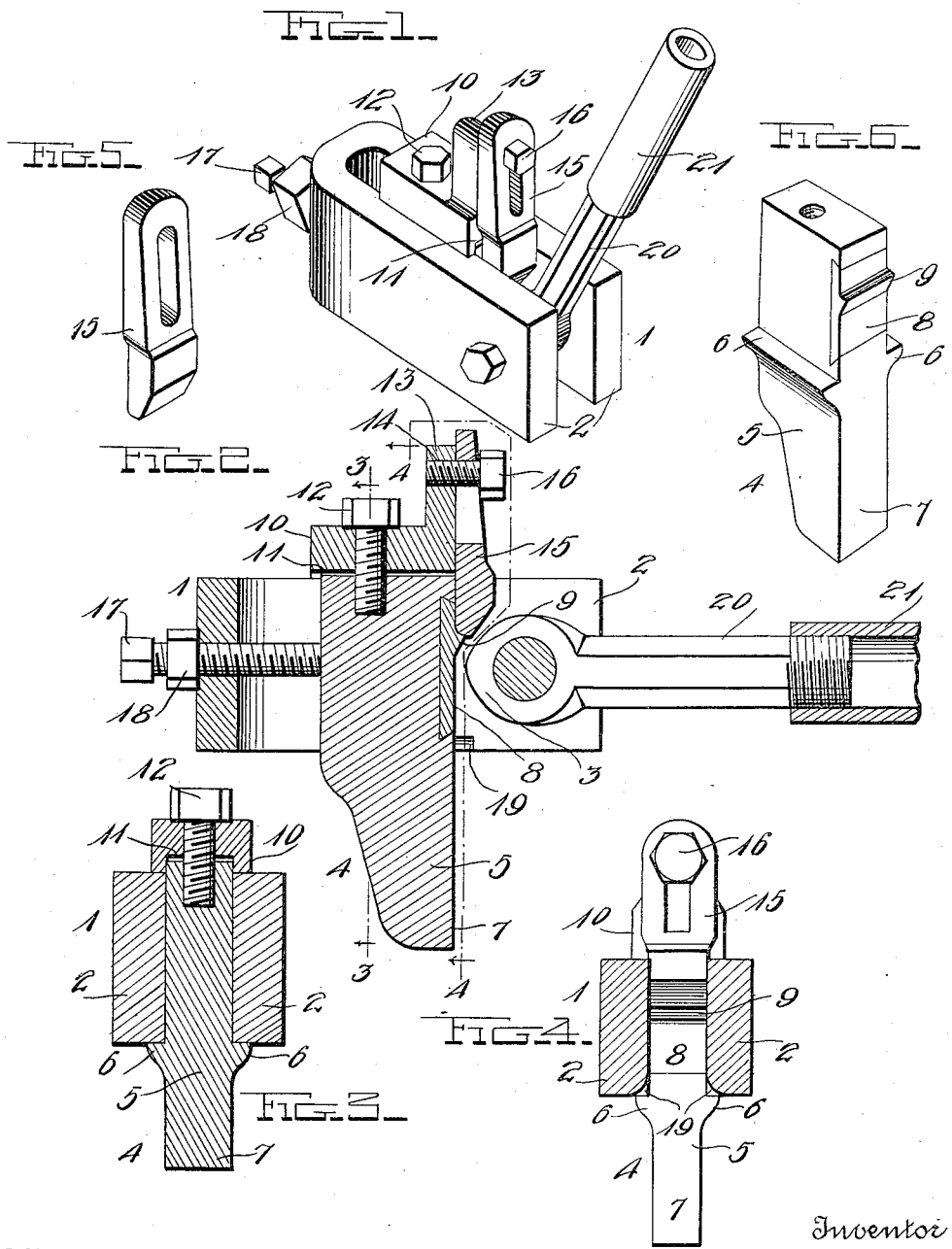

PEDRO ANDREW OLSEN, OF INGLEWOOD, WASHINGTON.

SAW-SET.

1,060,784.  Specification of Letters Patent.  Patented May 6, 1913.

Application filed June 5, 1911. Serial No. 631,254.

*To all whom it may concern:*

Be it known that I, PEDRO A. OLSEN, having filed notice of intention to become a citizen of the United States, residing at Inglewood, in the county of King and State of Washington, have invented certain new and useful Improvements in Saw-Sets; and I do declare the following to be a full, clear, and exact description of the invention, such as will enable others skilled in the art to which it appertains to make and use the same.

This invention relates to improvements in sets for drag saws.

One object of the invention is to provide a saw set of this character, by means of which the teeth of a drag saw may be quickly and uniformly set.

Another object is to provide a drag saw set adapted to be adjusted to set the teeth of the saw to a greater or less extent and which when thus adjusted needs no further attention.

A further and important object of the invention is in the provision of a device of the character described, whereby the teeth of the saw can be further pointed and drawn during the operation of setting the same.

With these and other objects in view, the invention consists of certain novel features of construction, combination and arrangement of parts as will be more fully described and particularly pointed out in the appended claim.

In the accompanying drawings:—Figure 1 is a perspective view of a saw set constructed in accordance with my invention; Fig. 2 is a central vertical longitudinal section; Fig. 3 is a vertical cross section on the line 3—3 of Fig. 2; Fig. 4 is a horizontal sectional view on the line 4—4 of Fig. 2; Fig. 5 is a detail perspective view of the adjustable member of the stop; Fig. 6 is a similar view of the anvil.

In the embodiment of the invention I provide a supporting member 1 which is preferably in the form of a strap or bar bent upon itself midway between its ends to form parallel side members 2 between the outer ends of which is pivotally mounted an eccentric die 3 by means of which the teeth are set against the anvil 4 hereinafter described.

The anvil 4 comprises a block or plate 5 adapted to fit closely between the side members 2 of the frame. On the lower portion of the block are formed laterally extending guide flanges 6 which engage the lower edges of the side members 2. Also arranged on the lower end of the block is a shank 7. Formed in the front edge of the block is a dovetailed shaped notch with which is removably engaged a hardened steel plate or jaw 8 having on its outer face an offset or rib 9 provided with a beveled outer surface against which the teeth of the saw are upset by the die 3.

The anvil is held in place in the frame by a member or bar 10 having a sliding engagement with the upper edge of the frame and having in its lower edge a recess 11 adapted to receive the upper edge of the anvil to which said member is removably secured by a screw 12. On the front end of the member 10 is formed an upwardly extending lug 13 having therein a screw hole 14. Secured to the lug 13 and engaged with the front edge of the anvil is an adjustable gage 15 having a slotted upper end adapted to receive a screw 16 which is engaged with the hole 14 in the lug 13 and thus adjustably secures the member 15 in place. The member 15 has its lower end beveled on its outer face to permit the free movement of die 3 and the lower end of this gage 15 is designed to engage the free end of the tooth being bent and by adjusting said gage the teeth of the saw may be set to a greater or less depth.

The anvil 4 is adjusted in the frame 1 with respect to the die 3 and to regulate the angle to which the teeth are set by an adjusting screw 17 having thereon a jam nut 18 whereby the screw is locked in its adjusted position. When the anvil has been thus adjusted to the desired position the same is securely fastened by tightening the screw 12 and thus clamping the member 10 into engagement with the upper edges of the frame and the guide flanges 6 into engagement with the lower edges of the frame as will be readily understood.

In the inner corners of the lower edges of the frame are formed beveled notches 19 with which the edges of the inner portions of the teeth are engaged when the set is arranged thereon whereby the seat snugly fits the tooth to be set and the saw is held against lateral movement. When the set is thus engaged with the teeth the die 3 is operated to upset the teeth against the beveled offset 9 of the plate or jaw 8 of the anvil and the beveled lower end of the adjustable member 15. The die 3 has formed thereon an integral shank 20 to which is adapted to be attached an operating handle or lever 21 whereby the die is operated and brought into forcible engagement with the teeth of the saw for upsetting the same in the manner described.

The saw tooth engaging faces formed by the anvil, outwardly projecting offset face 9 thereof and particular formation of the lower edge of the gage 15 constitutes an important feature of the invention, and it is obvious that when the tooth of the saw is first inserted in the device and the point of the same brought in contact with the rounded lower edge of said gage, the tooth is in a position to be primarily set when the eccentric die 3 is brought in binding contact therewith, and on a further downward movement of the handle 21 forming a continuation of the shank 20 of said eccentric die, the point of the tooth will be drawn beyond the lower rounded edge of the gage and said point thus reduced and drawn to the extent desired.

From the foregoing description, taken in connection with the accompanying drawings, the construction and operation of the invention will be readily understood without requiring a more extended explanation.

Having thus described my invention, what I claim is:

A saw set comprising a supporting frame having parallel side members, an anvil slidably and adjustably secured between said side members and having a transverse dove-tail recess in its face between the upper and lower edges of the side members of the frame, a die located in said dove-tail recess having a beveled rib on its outer face and an extension above said rib, a tapering gage adjustably secured to the anvil and having a lower rounded edge which is slightly wider than the rib over which the teeth of the saw to be set are adapted to ride, said gage having an outer inclined projecting face terminating at the lower rounded edge of the same, whereby the beveled face of the rib of the die substantially forms a continuation of the curved face of the anvil, and an eccentric die pivotally mounted between the side members of the frame and adapted to engage with the teeth of the saw and adjusted between the rib of the die and lower outer inclined surface of the anvil, whereby the teeth of the saw are adapted to be set at the desired angle, and subsequently pointed and drawn by the eccentric die by being forced over the rounded lower edge of the gage.

In testimony whereof I have hereunto set my hand in presence of two subscribing witnesses.

PEDRO ANDREW OLSEN.

Witnesses:
    JOSEPH F. WEBER,
    JOHN JOHANNESEN.

---

Copies of this patent may be obtained for five cents each, by addressing the "Commissioner of Patents, Washington, D. C."